United States Patent
Rafique et al.

(10) Patent No.: US 9,025,482 B2
(45) Date of Patent: May 5, 2015

(54) QUANTITATIVE INTERFERENCE DETECTION

(71) Applicant: QUALCOMM Incorporated, San Diego, CA (US)

(72) Inventors: Hassan Rafique, Farnborough (GB); Divaydeep Sikri, Farnborough (GB); Cetin Atlan, Farnborough (GB); Zhi-Zhong Yu, Berkshire (GB); Nico De Laurentiis, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 13/655,995

(22) Filed: Oct. 19, 2012

(65) Prior Publication Data
US 2014/0112161 A1  Apr. 24, 2014

(51) Int. Cl.
H04L 12/26 (2006.01)
(52) U.S. Cl.
CPC .................. H04L 43/0823 (2013.01)
(58) Field of Classification Search
CPC ........................... H04W 24/00; H04L 43/0823
USPC .................. 370/252, 329, 336, 338
See application file for complete search history.

(56) References Cited

U.S. PATENT DOCUMENTS

| | | | |
|---|---|---|---|
| 7,012,977 | B2 | 3/2006 | Madkour et al. |
| 7,937,086 | B2 | 5/2011 | Chen et al. |
| 8,154,419 | B2 | 4/2012 | Daussin et al. |
| 8,760,993 | B2 * | 6/2014 | Lopez et al. ............. 370/207 |
| 2006/0276227 | A1 * | 12/2006 | Dravida ................. 455/562.1 |
| 2010/0067440 | A1 * | 3/2010 | Dick et al. ............. 370/328 |
| 2010/0279701 | A1 | 11/2010 | Chen |
| 2010/0302956 | A1 | 12/2010 | Haverty |
| 2010/0322092 | A1 | 12/2010 | Yu |

(Continued)

FOREIGN PATENT DOCUMENTS

EP    2387277 A1   11/2011
JP    2011511549 A   4/2011

(Continued)

OTHER PUBLICATIONS

"Digital cellular telecommunications system (Phase 2+); Circuit switched voice capacity evolution for GSM/EDGE Radio Access Network (GERAN) (3GPP TR 45.914 version 9.4.0 Release 9)", Technical Report, European Telecommunications Standards Institute (ETSI), 650, Route Des Lucioles ; F-06921 Sophia-Antipolis ; France, vol. 3GPP GERAN 1, No. V9.4.0, Jan. 1, 2011, XP014061823.

(Continued)

*Primary Examiner* — Rasheed Gidado
(74) *Attorney, Agent, or Firm* — James Hunt Yancey, Jr.; Stanton Braden

(57) ABSTRACT

A method for wireless communications is described. The method includes beginning a voice call using a voice services over adaptive multi-user channels on one slot receiver. Pilot signal knowledge is obtained. Interferers knowledge is also obtained. Error metrics are computed using the pilot signal knowledge and the interferers knowledge. The method further includes selecting between the voice services over adaptive multi-user channels on one slot receiver and a legacy receiver for the voice call based on the error metrics. Other aspects, embodiments and features are also claimed and described.

24 Claims, 12 Drawing Sheets

(56) References Cited

U.S. PATENT DOCUMENTS

| | | | |
|---|---|---|---|
| 2011/0082689 A1* | 4/2011 | Juncker et al. | 704/201 |
| 2011/0176522 A1 | 7/2011 | Choi et al. | |
| 2011/0267968 A1 | 11/2011 | Yu et al. | |
| 2012/0113963 A1* | 5/2012 | Liberg et al. | 370/337 |
| 2012/0220292 A1 | 8/2012 | Yu et al. | |
| 2013/0163443 A1* | 6/2013 | Liberg et al. | 370/252 |
| 2014/0044107 A1* | 2/2014 | Jacob | 370/336 |

FOREIGN PATENT DOCUMENTS

| | | |
|---|---|---|
| JP | 2012500515 A | 1/2012 |
| WO | WO2009096840 A1 | 8/2009 |
| WO | 2010021634 A1 | 2/2010 |
| WO | 2010021637 A1 | 2/2010 |
| WO | WO2011042881 A1 | 4/2011 |

OTHER PUBLICATIONS

Lei, et al., "Subchannel interference cancellation for GERAN/VAMOS systems," IEEE International Conference on Communications Technology and Applications (ICCTA '09), 2009, pp. 157-161.

Rinne, "Convergence of Packet Communications Over the Evolved Mobile Networks; Signal Processing and Protocol Performance," Aalto University School of Science and Technology Department of Signal Processing and Acoustics, Report 15, 2010, 284 pages.

Digital cellular telecommunications system (Phase 2+); Physical layer on the radio path; General description (3GPP TS 45.001 version 9.3.0 Release 9), ETSI TS 145 001 V9.3.0 (Dec. 2010), pp. 1-45.

Research in Motion U.K Ltd., "Performance of DARP Phase Handsets in VAMOS Mode", 3GPP TSG GERAN #47, GP-101266, Retreived from the Internet: <www.3gpp.org/ftp/tsg_geran/TSG . . . /Tdoclist%20GERAN%2347.doc>, Sep. 3, 2010, pp. 1-34.

* cited by examiner

QUANTITATIVE INTERFERENCE DETECTION

TECHNICAL FIELD

The present disclosure relates generally to communication systems. More specifically, the present disclosure relates to systems and methods for quantitative interference detection.

BACKGROUND

Wireless communication systems have become an important means by which many people worldwide communicate. A wireless communication system may provide communication for a number of subscriber stations, each of which may be serviced by a base station.

New subscriber stations are continuously being released to the public. These new subscriber stations boast more features and increased reliability. However, older subscriber stations continue to be used by consumers for many reasons.

Sometimes older subscriber stations may be collectively referred to as legacy devices. As updates are made to base stations, operation of legacy devices may be considered as the legacy devices are still being actively used.

Some subscriber stations may include components allow the subscriber stations to communicate using either new technology or older legacy technology. Current technology for switching between new technology and older legacy technology can be improved that allow subscriber stations to select an appropriate receiver in an efficient manner.

SUMMARY OF SOME EXAMPLE EMBODIMENTS

Embodiments of the present invention are aimed at addressing the above discussed issues as well as others. Some sample embodiments of the present invention are summarized below. The summaries are provided for the reader's convenience yet are not to be used for limiting the full breadth of the claimed technology. Some features may not be summarized below as they are discussed in the detailed description.

According to some embodiments, a method for wireless communications is described. The method includes beginning a voice call using a voice services over adaptive multi-user channels on one slot receiver. Pilot signal knowledge is obtained. Interferers knowledge is also obtained. Error metrics are computed using the pilot signal knowledge and the interferers knowledge. The method also includes selecting between the voice services over adaptive multi-user channels on one slot receiver and a legacy receiver for the voice call based on the error metrics.

Method embodiments can have additional features. For example, a method may be performed by a wireless communication device. The error metrics may indicate that the voice services over adaptive multi-user channels on one slot receiver should be used for the voice call. The voice call may continue using the voice services over adaptive multi-user channels on one slot receiver. The error metrics may indicate a wireless communications channel that is interference limited. The error metrics may indicate that the voice call is sharing a timeslot with a paired wireless communication device.

Additional method embodiments can have other features too. For example, the error metrics may indicate that the legacy receiver should be used for the voice call. The voice call may be switched to the legacy receiver. The error metrics may indicate a wireless communications channel that is noise limited. The error metrics may indicate that the voice call is not sharing a timeslot with a paired wireless communication device. An inverse of the error metrics may be a representation of a channel quality for all paired wireless communication devices that are sharing a timeslot. A relative strength of the error metrics may quantitatively describe a power imbalance between paired wireless communication devices.

Embodiments can also include an apparatus for wireless communications. An apparatus can generally include a processor, memory in electronic communication with the processor and instructions stored in the memory. Instructions are executable by the processor to begin a voice call using a voice services over adaptive multi-user channels on one slot receiver. The instructions are also executable by the processor to obtain pilot signal knowledge. The instructions are further executable by the processor to obtain interferers knowledge. The instructions are also executable by the processor to compute error metrics using the pilot signal knowledge and the interferers knowledge. The instructions are further executable to select between the voice services over adaptive multi-user channels on one slot receiver and a legacy receiver for the voice call based on the error metrics.

Further embodiments can also include wireless devices. A wireless device can include means for beginning a voice call using a voice services over adaptive multi-user channels on one slot receiver. The wireless device also includes means for obtaining pilot signal knowledge. The wireless device further includes means for obtaining interferers knowledge. The wireless device also includes means for computing error metrics using the pilot signal knowledge and the interferers knowledge. The wireless device further includes means for selecting between the voice services over adaptive multi-user channels on one slot receiver and a legacy receiver for the voice call based on the error metrics.

Other embodiments can also include a computer-program product for wireless communications. A computer-program product can include a non-transitory computer-readable medium having instructions thereon. Instructions include code for causing a wireless communication device to begin a voice call using a voice services over adaptive multi-user channels on one slot receiver. Instructions also include code for causing the wireless communication device to obtain pilot signal knowledge. The instructions further include code for causing the wireless communication device to obtain interferers knowledge. The instructions also include code for causing the wireless communication device to compute error metrics using the pilot signal knowledge and the interferers knowledge. The instructions can include code for causing the wireless device to select between voice services over adaptive multi-user channels on one slot receiver and a legacy receiver for a voice call based on error metrics.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that

DETAILED DESCRIPTION

More and more people are using wireless communication devices, such as, mobile phones, not only for voice but also for data communications. Telecommunications networks are being placed under increasing strain, both due to increasing bandwidth requirements of smartphones and mobile computers, and the increasing number of devices and programs that seek access to the networks. For example, many applications running on smartphones periodically access the network to check for updates. While each access itself only consumes a relatively small amount of bandwidth, large numbers of devices running lots of applications can place a significant load on networks, and signaling and control channels in particular. Other features include efficient operation mechanism in an efficient manner to limit interference.

Figure 1:
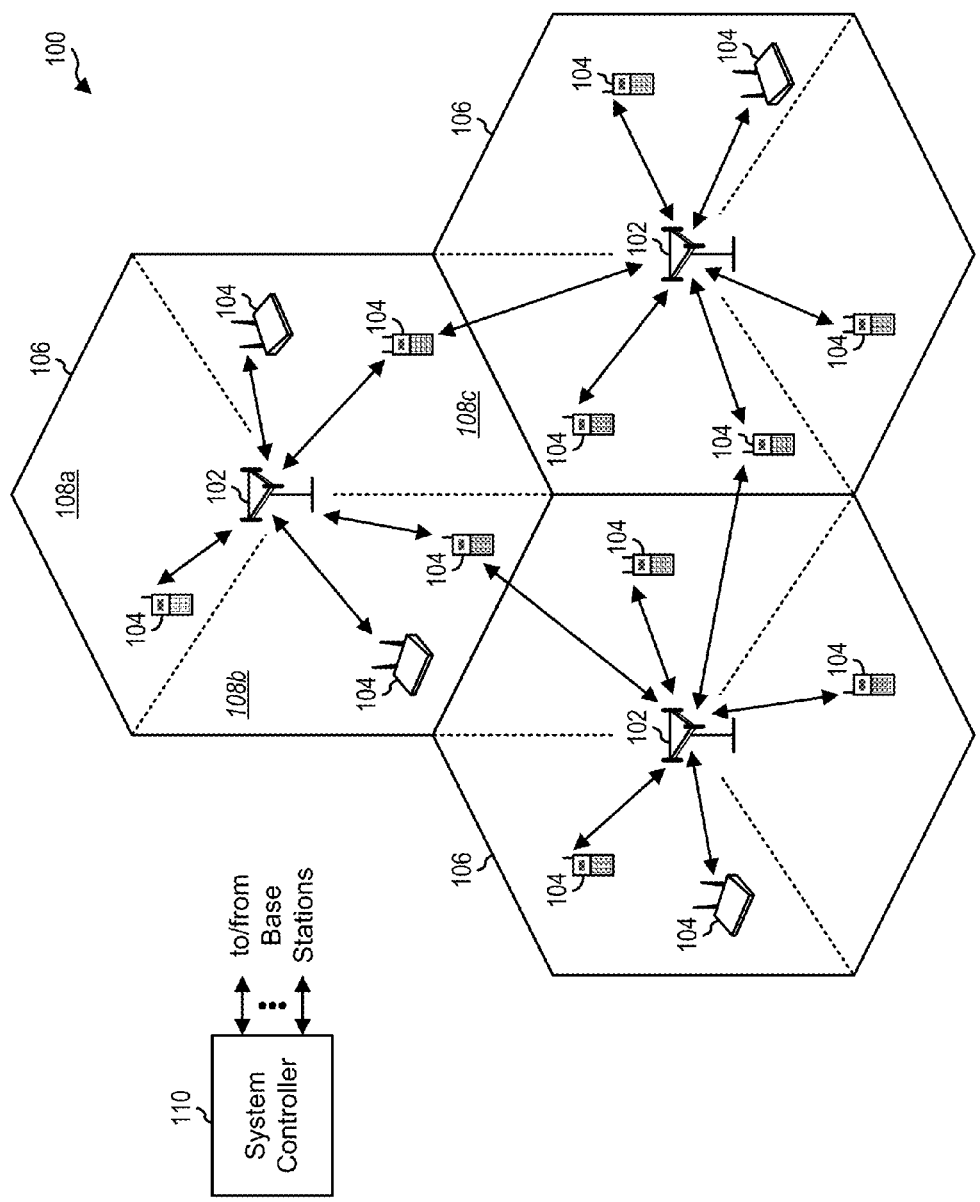
FIG. 1 shows an example of a wireless communication system in which embodiments of the present invention disclosed herein may be utilized.

FIG. 1 shows an example of a wireless communication system 100 in which embodiments of the present invention disclosed herein may be utilized. The wireless communication system 100 includes multiple base stations 102 and multiple wireless communication devices 104. Each base station 102 provides communication coverage for a particular geographic area 106. The term "cell" can refer to a base station 102 and/or its coverage area 106 depending on the context in which the term is used.

The terms "wireless communication device" and "base station" utilized in this application can generally refer to an array of components. For example, as used herein, the term "wireless communication device" refers to an electronic device that may be used for voice and/or data communication over a wireless communication system. Examples of wireless communication devices 104 include cellular phones, personal digital assistants (PDAs), handheld devices, wireless modems, laptop computers and personal computers. A wireless communication device 104 may alternatively be referred to as an access terminal, a mobile terminal, a mobile station, a remote station, a user terminal, a terminal, a subscriber unit, a subscriber station, a mobile device, a wireless device, user equipment (UE), or some other similar terminology. Also, the term "base station" can refer to a wireless communication station that is installed at a fixed location and used to communicate with wireless communication devices 104. A base station 102 may alternatively be referred to as an access point (including nano-, pico- and femto-cells), a Node B, an evolved Node B, a Home Node B or some other similar terminology.

To improve system capacity, a base station coverage area 106 may be partitioned into plural smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Wireless communication devices 104 are typically dispersed throughout the wireless communication system 100. A wireless communication device 104 may communicate with one or more base stations 102 on the downlink and/or uplink at any given moment. The downlink (or forward link) refers to the communication link from a base station 102 to a wireless communication device 104, and the uplink (or reverse link) refers to the communication link from a wireless communication device 104 to a base station 102. Uplink and downlink may refer to the communication link or to the carriers used for the communication link.

For a centralized architecture, a system controller 110 may couple to the base stations 102 and provide coordination and control for the base stations 102. The system controller 110 may be a single network entity or a collection of network entities. As another example, for a distributed architecture, base stations 102 may communicate with one another as needed.

Figure 2:
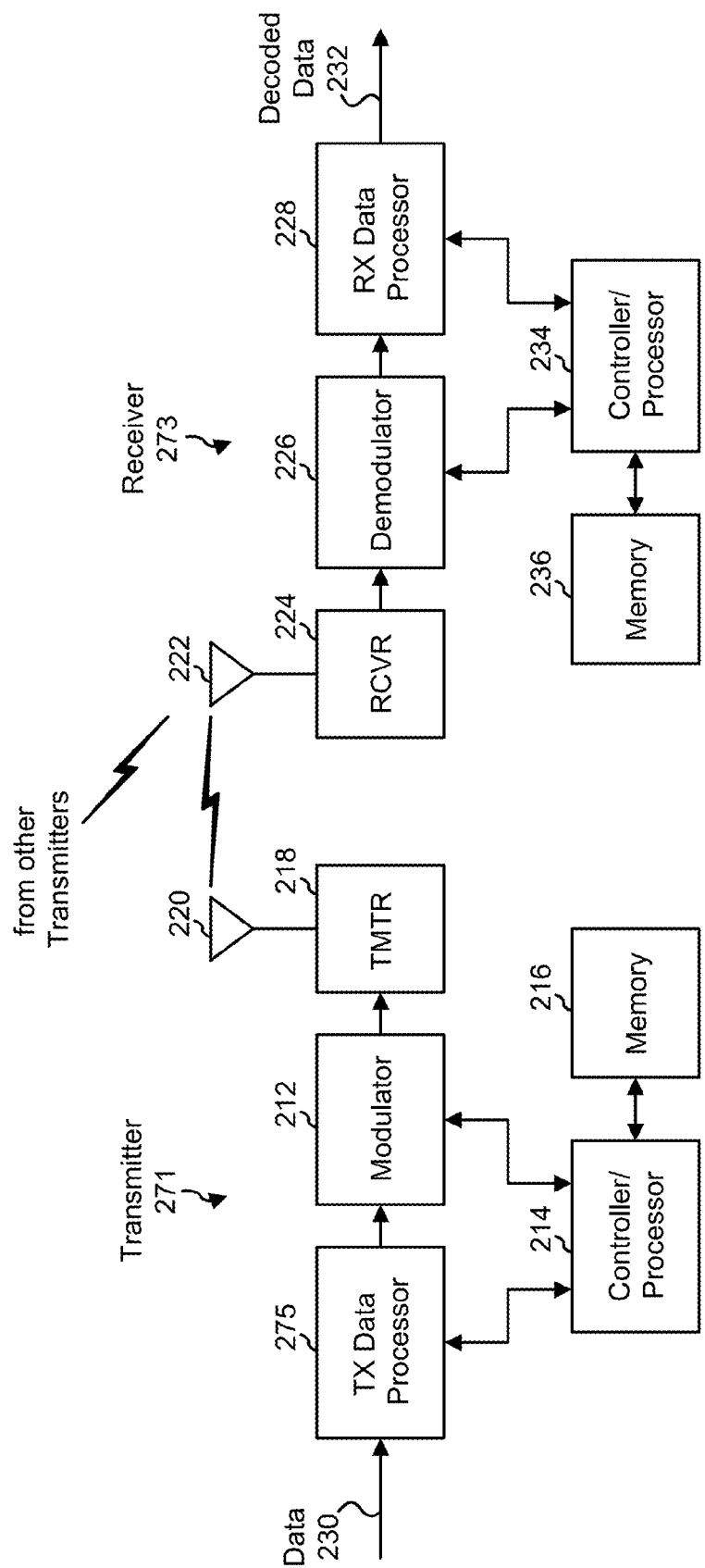
FIG. 2 shows a block diagram of a transmitter and a receiver in a wireless communication system according to some embodiments of the present invention.

FIG. 2 shows a block diagram of a transmitter 271 and a receiver 273 in a wireless communication system 100 according to some embodiments of the present invention. For the downlink, the transmitter 271 may be part of a base station 102 and the receiver 273 may be part of a wireless communication device 104. For the uplink, the transmitter 271 may be part of a wireless communication device 104 and the receiver 273 may be part of a base station 102.

At the transmitter 271, a transmit (TX) data processor 275 receives and processes (e.g., formats, encodes, and interleaves) data 230 and provides coded data. A modulator 212 performs modulation on the coded data and provides a modulated signal. The modulator 212 may perform Gaussian minimum shift keying (GMSK) for GSM, 8-ary phase shift keying (8-PSK) for Enhanced Data rates for Global Evolution (EDGE), etc. GMSK is a continuous phase modulation protocol whereas 8-PSK is a digital modulation protocol. A transmitter unit (TMTR) 218 conditions (e.g., filters, amplifies, and upconverts) the modulated signal and generates an RF modulated signal, which is transmitted via an antenna 220.

At the receiver 273, an antenna 222 receives RF modulated signals from the transmitter 271 and other transmitters. The antenna 222 provides a received RF signal to a receiver unit (RCVR) 224. The receiver unit 224 conditions (e.g., filters, amplifies, and downconverts) the received RF signal, digitizes the conditioned signal, and provides samples. A demodulator 226 processes the samples as described below and provides demodulated data. A receive (RX) data processor 228 processes (e.g., deinterleaves and decodes) the demodulated data and provides decoded data. In general, the processing by demodulator 226 and RX data processor 228 is complementary to the processing by the modulator 212 and the TX data processor 275, respectively, at the transmitter 271.

Controllers/processors 214 and 234 direct operation at the transmitter 271 and receiver 273, respectively. Memories 216 and 236 store program codes in the form of computer software and data used by the transmitter 271 and receiver 273, respectively.

Figure 3:
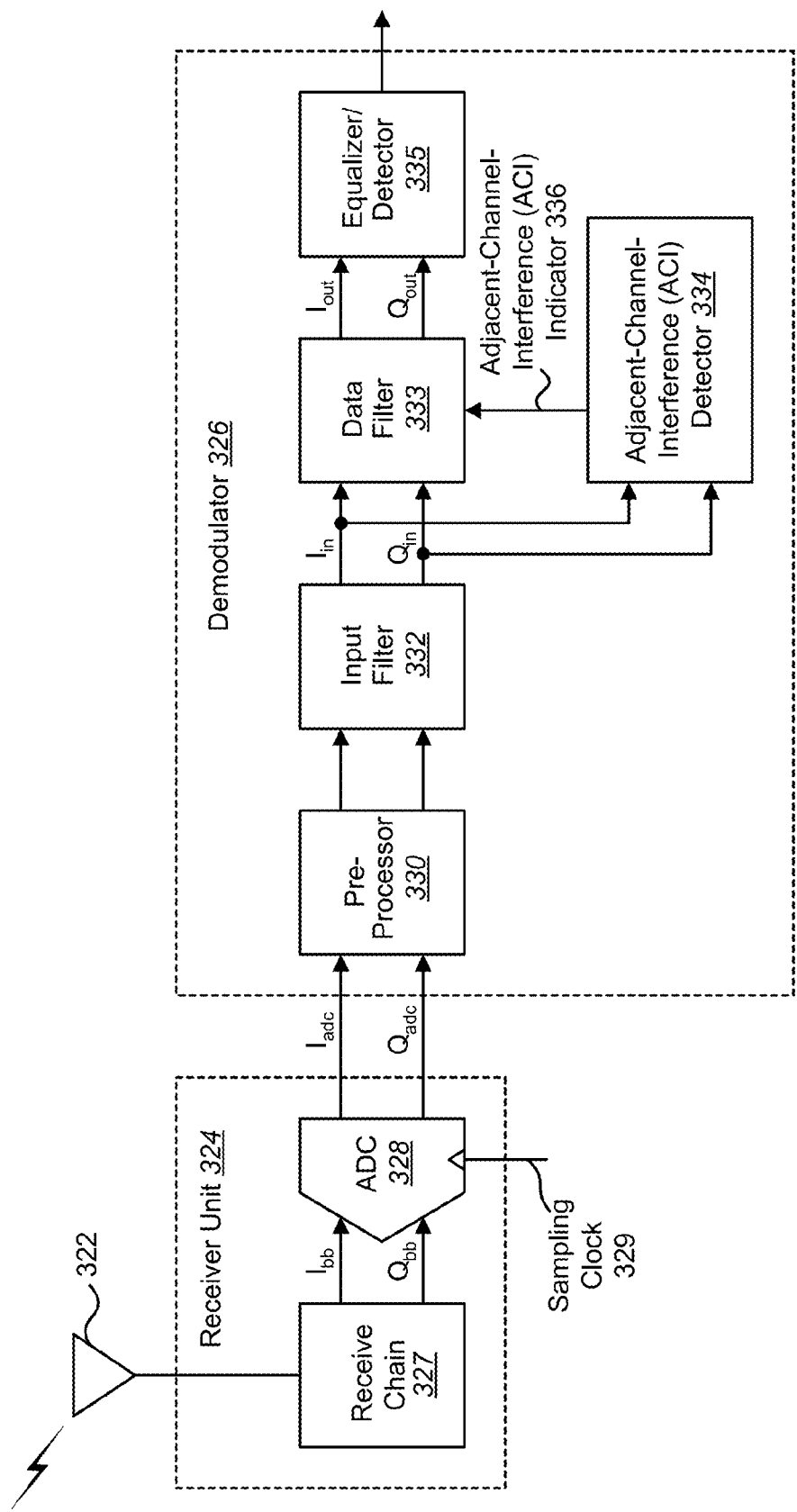
FIG. 3 shows a block diagram of a design of a receiver unit and demodulator at a receiver according to some embodiments of the present invention.

FIG. 3 shows a block diagram of a design of a receiver unit 324 and a demodulator 326 at a receiver 273. Within the receiver unit 324, a receive chain 327 processes the received RF signal (received by an antenna 322) and provides I (in-phase) and Q (quadrature) baseband signals, which are denoted as $I_{bb}$ and $Q_{bb}$. The receive chain 327 may perform low noise amplification, analog filtering, quadrature downconversion, etc. as desired or needed. An analog-to-digital converter (ADC) 328 digitizes the I and Q baseband signals at a sampling rate of $f_{adc}$ from a sampling clock 329 and provides I and Q samples, which are denoted as $I_{adc}$ and $Q_{adc}$. In general, the ADC sampling rate $f_{adc}$ may be related to the symbol rate $f_{sym}$ by any integer or non-integer factor.

Within the demodulator 326, a pre-processor 330 performs pre-processing on the I and Q samples from the analog-to-digital converter (ADC) 328. For example, the pre-processor 330 may remove direct current (DC) offset, remove frequency offset, etc. An input filter 332 filters the samples from the pre-processor 330 based on a particular frequency response and provides input I and Q samples, which are denoted as $I_{in}$ and $Q_{in}$. The input filter 332 may filter the I and Q samples to suppress images resulting from the sampling by the analog-to-digital converter (ADC) 328 as well as jammers. The input filter 332 may also perform sample rate conversion, e.g., from 24× oversampling down to 2× oversampling. A data filter 333 filters the input I and Q samples from the input filter 332 based on another frequency response and provides output I and Q samples, which are denoted as $I_{out}$ and $Q_{out}$. The input filter 332 and the data filter 333 may be implemented with finite impulse response (FIR) filters, infinite impulse response (IIR) filters, or filters of other types. The frequency responses of the input filter 332 and the data filter 333 may be selected to achieve good performance. In some embodiments, the frequency response of the input filter 332 is fixed and the frequency response of the data filter 333 is configurable.

An adjacent-channel-interference (ACI) detector 334 receives the input I and Q samples from the input filter 332. The ACI 334 can detect for adjacent-channel-interference (ACI) in the received RF signal and provides an adjacent-channel-interference (ACI) indicator 336 to the data filter 333. The adjacent-channel-interference (ACI) indicator 336 may indicate whether or not adjacent-channel-interference (ACI) is present and, if present, whether the adjacent-channel-interference (ACI) is due to the higher RF channel centered at +200 kilohertz (kHz) and/or the lower RF channel centered at −200 kHz. The frequency response of the data filter 333 may be adjusted based on the adjacent-channel-interference (ACI) indicator 336, to achieve desirable performance.

An equalizer/detector 335 receives the output I and Q samples from the data filter 333 and performs equalization, matched filtering, detection and/or other processing on these samples. For example, the equalizer/detector 335 may implement a maximum likelihood sequence estimator (MLSE) that determines a sequence of symbols that is most likely to have been transmitted given a sequence of I and Q samples and a channel estimate. The device shown in FIG. 3*can* be configured for communication among many different types of wireless technologies, including GSM.

The Global System for Mobile Communications (GSM) is a widespread standard in cellular, wireless communication. GSM is relatively efficient for standard voice services. However, high-fidelity audio and data services require higher data throughput rates than that for which GSM is optimized. To increase capacity, the General Packet Radio Service (GPRS), EDGE (Enhanced Data rates for GSM Evolution) and UMTS (Universal Mobile Telecommunications System) standards have been adopted in GSM systems. In the GSM/EDGE Radio Access Network (GERAN) specification, GPRS and EGPRS provide data services. The standards for GERAN are maintained by the 3GPP (Third Generation Partnership Project). GERAN is a part of GSM. More specifically, GERAN is the radio part of GSM/EDGE together with the network that joins the base stations 102 (the Ater and Abis interfaces) and the base station controllers (A interfaces, etc.). GERAN represents the core of a GSM network. It routes phone calls and packet data from and to the PSTN (Public Switched Telephone Network) and Internet to and from remote terminals. GERAN is also a part of combined UMTS/GSM networks.

GSM employs a combination of Time Division Multiple Access (TDMA) and Frequency Division Multiple Access (FDMA) for the purpose of sharing the spectrum resource. GSM networks typically operate in a number of frequency bands. For example, for uplink communication, GSM-900 commonly uses a radio spectrum in the 890-915 megahertz (MHz) bands (Mobile Station to Base Transceiver Station). For downlink communication, GSM 900 uses 935-960 MHz bands (base station 102 to wireless communication device 104). Furthermore, each frequency band is divided into 200 kHz carrier frequencies providing 124 RF channels spaced at 200 kHz. GSM-1900 uses the 1850-1910 MHz bands for the uplink and 1930-1990 MHz bands for the downlink. Like GSM 900, FDMA divides the spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

An example of an existing GSM system is identified in technical specification document 3GPP TS 45.002 V4.8.0 (2003 June) entitled "Technical Specification 3rd Generation Partnership Project; Technical Specification Group GSM/EDGE Radio Access Network; Multiplexing and multiple access on the radio path (Release 4)", published by the 3rd Generation Partnership Project (3GPP) standards-setting organization.

Each channel in GSM is identified by a specific absolute radio frequency channel (ARFCN). For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800. Also, each base station 102 is assigned one or more carrier frequencies. Each carrier frequency is divided into eight time slots (which are labeled as time slots 0 through 7) using TDMA such that eight consecutive time slots form one TDMA frame with a duration of 4.615 milliseconds (ms). A physical channel occupies one time slot within a TDMA frame. Each active wireless communication device 104 or user is assigned one or more time slot indices for the duration of a call. User-specific data for each wireless communication device 104 is sent in the time slot(s) assigned to that wireless communication device 104 and in TDMA frames used for the traffic channels.

Figure 4:
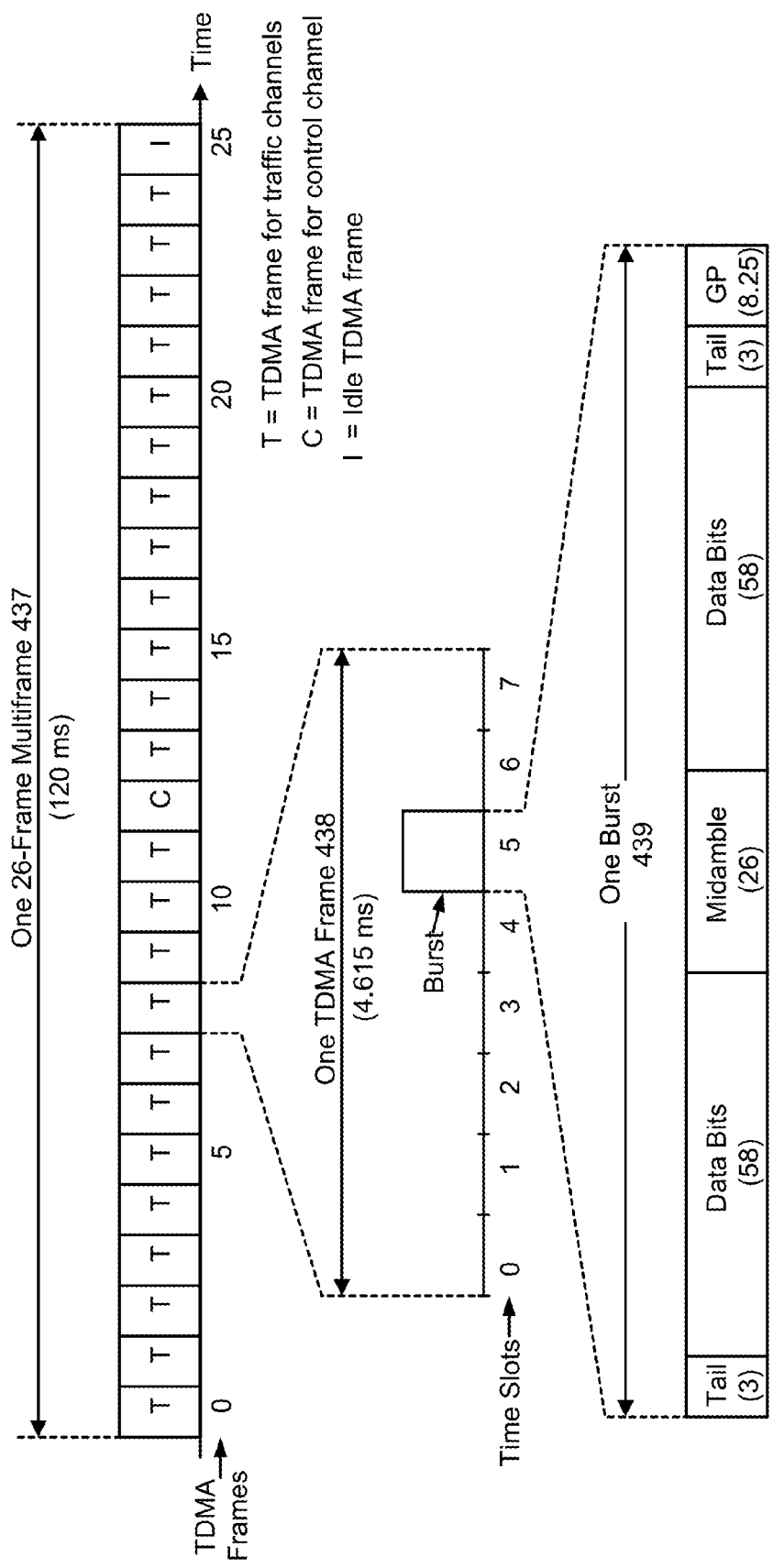
FIG. 4 shows example frame and burst formats in GSM according to some embodiments of the present invention.

FIG. 4 shows example frame and burst formats in GSM. The timeline for transmission is divided into multiframes 437. For traffic channels used to transmit user-specific data, each multiframe 437 in this example includes 26 TDMA frames 438, which are labeled as TDMA frames 0 through 25. The traffic channels are sent in TDMA frames 0 through 11 and TDMA frames 13 through 24 of each multiframe 437. A control channel is sent in TDMA frame 12. No data is sent in idle TDMA frame 25, which is used by the wireless communication devices 104 to make measurements of signals transmitted by neighbor base stations 102.

Each time slot within a frame is also referred to as a "burst" 439 in GSM. Each burst 439 includes two tail fields, two data fields, a training sequence (or midamble) field and a guard period (GP). The number of symbols in each field is shown inside the parentheses. A burst 439 includes symbols for the tail, data, and midamble fields. No symbols are sent in the guard period. TDMA frames of a particular carrier frequency are numbered and formed in groups of 26 or 51 TDMA frames 438 called multiframes 437.

Figure 5:
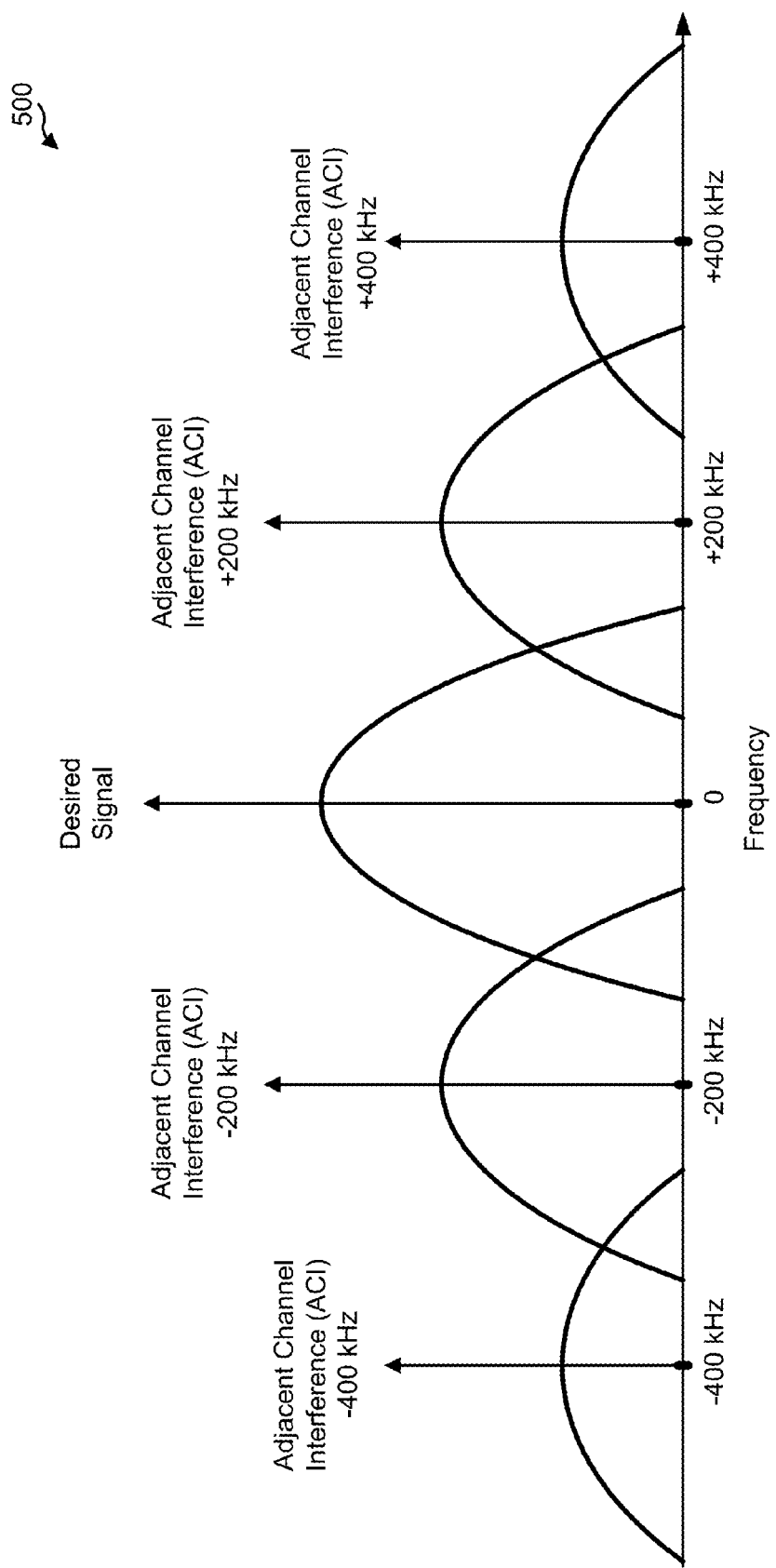
FIG. 5 shows an example spectrum in a GSM system according to some embodiments of the present invention.

FIG. 5 shows an example spectrum 500 in a GSM system. In this example, five RF modulated signals are transmitted on five RF channels that are spaced apart by 200 kHz. The RF channel of interest is shown with a center frequency of 0 Hz. The two adjacent RF channels have center frequencies that are +200 kHz and −200 kHz from the center frequency of the desired RF channel. The next two nearest RF channels (which are referred to as blockers, non-adjacent RF channels or adjacent channel interferers (ACI)) have center frequencies that are +400 kHz and −400 kHz from the center frequency of the desired RF channel. There may be other RF channels in the spectrum 500, which are not shown in FIG. 5 for simplicity. In GSM, an RF modulated signal is generated with a symbol rate of $f_{sym}=13000/40=270.8$ kilo symbols/second (ksps) and has a −3 decibel (dB) bandwidth of up to 135 kHz. The RF modulated signals on adjacent RF channels may thus overlap one another at the edges, as shown in FIG. 5.

In GSM/EDGE, frequency bursts (FB) are sent regularly by the base station 102 to allow wireless communication devices 104 to synchronize their local oscillator (LO) to the base Station 102 local oscillator (LO), using frequency offset estimation and correction. These bursts comprise a single tone, which corresponds to all "0" payload and training sequence. The all zero payload of the frequency burst is a constant frequency signal, or a single tone burst. When in power mode, the wireless communication device 104 hunts continuously for a frequency burst from a list of carriers. Upon detecting a frequency burst, the wireless communication device 104 will estimate the frequency offset relative to its nominal frequency, which is 67.7 kHz from the carrier. The wireless communication device 104 local oscillator (LO) will be corrected using this estimated frequency offset. In power up mode, the frequency offset can be as much as +/−19 kHz. The wireless communication device 104 will periodically wakeup to monitor the frequency burst to maintain its synchronization in standby mode. In the standby mode, the frequency offset is within ±2 kHz.

One or more modulation schemes are used in GERAN systems to communicate information such as voice, data, and/or control information. Examples of the modulation schemes may include GMSK (Gaussian Minimum Shift Keying), M-ary QAM (Quadrature Amplitude Modulation) or M-ary PSK (Phase Shift Keying), where $M=2^n$, with n being the number of bits encoded within a symbol period for a specified modulation scheme. GMSK is a constant envelope binary modulation scheme allowing raw transmission at a maximum rate of 270.83 kilobits per second (Kbps).

General Packet Radio Service (GPRS) is a non-voice service. It allows information to be sent and received across a mobile telephone network. It supplements Circuit Switched Data (CSD) and Short Message Service (SMS). GPRS employs the same modulation schemes as GSM. GPRS allows for an entire frame (all eight time slots) to be used by a single mobile station at the same time. Thus, higher data throughput rates are achievable.

The EDGE standard uses both the GMSK modulation and 8-PSK modulation. Also, the modulation type can be changed from burst to burst. 8-PSK modulation in EDGE is a linear, 8-level phase modulation with $3\pi/8$ rotation, while GMSK is a non-linear, Gaussian-pulse-shaped frequency modulation. However, the specific GMSK modulation used in GSM can be approximated with a linear modulation (i.e., 2-level phase modulation with a $\pi/2$ rotation). The symbol pulse of the approximated GSMK and the symbol pulse of 8-PSK are identical. The EGPRS2 standard uses GMSK, QPSK, 8-PSK, 16-QAM and 32-QAM modulations. The modulation type can be changed from burst to burst. Q-PSK, 8-PSK, 16-QAM and 32-QAM modulations in EGPRS2 are linear, 4-level, 8-level, 16-level and 32-level phase modulations with $3\pi/4$, $3\pi/8$, $\pi/4$, $-\pi/4$ rotation, while GMSK is a non-linear, Gaussian-pulse-shaped frequency modulation. However, the specific GMSK modulation used in GSM can be approximated with a linear modulation (i.e., 2-level phase modulation with a $\pi/2$ rotation). The symbol pulse of the approximated GSMK and the symbol pulse of 8-PSK are identical. The symbol pulse of Q-PSK, 16-QAM and 32-QAM can use spectrally narrow or wide pulse shapes.

Figure 6:
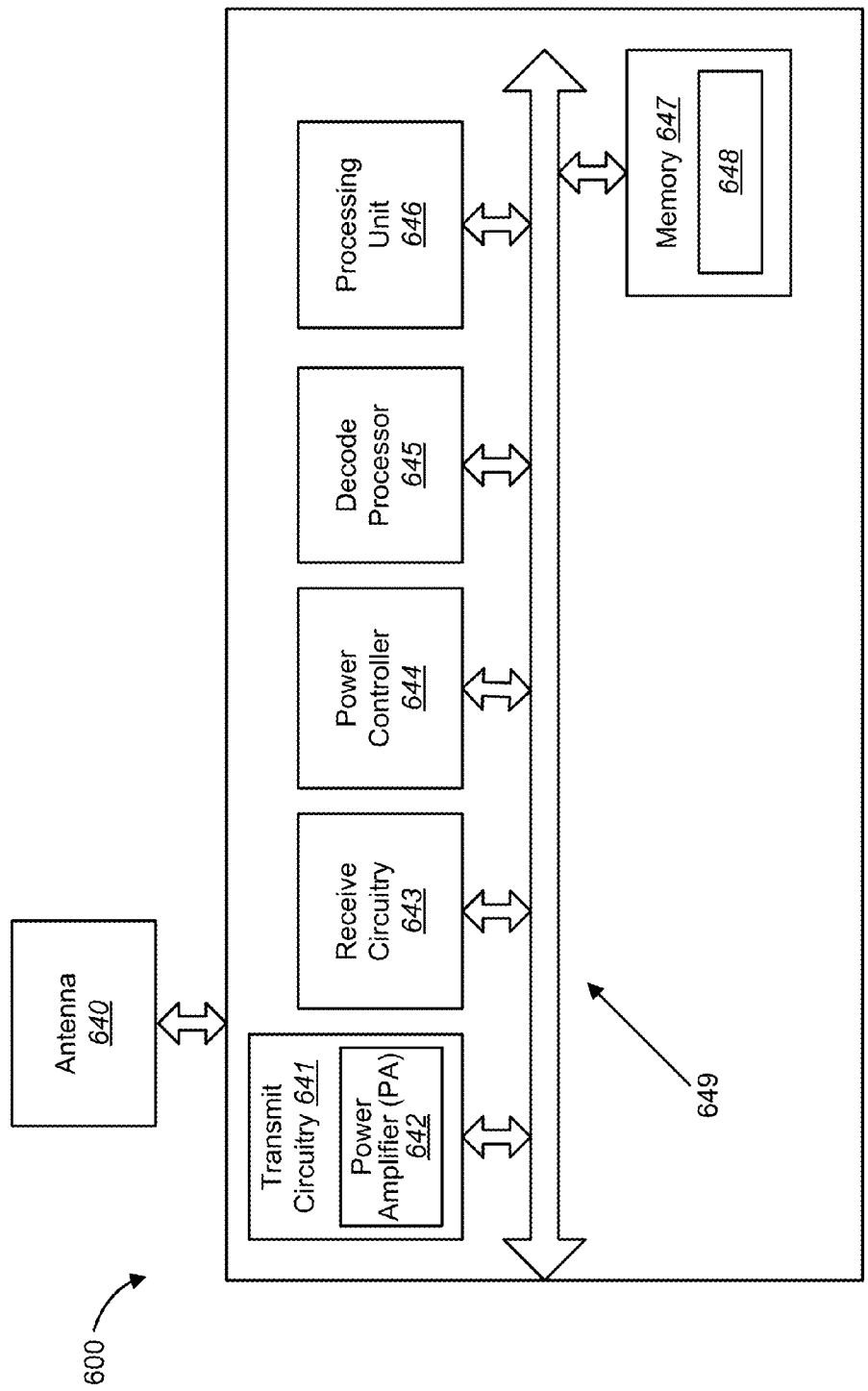
FIG. 6 illustrates an example of a wireless device that includes transmit circuitry (including a power amplifier), receive circuitry, a power controller, a decode processor, a processing unit for use in processing signals and memory according to some embodiments of the present invention.

FIG. 6 illustrates an example of a wireless device 600 that includes transmit circuitry 641 (including a power amplifier 642), receive circuitry 643, a power controller 644, a decode processor 645, a processing unit 646 for use in processing signals and memory 647. The wireless device 600 may be a base station 102 or a wireless communication device 104. The transmit circuitry 641 and the receive circuitry 643 may allow transmission and reception of data, such as audio communications, between the wireless device 600 and a remote location. The transmit circuitry 641 and receive circuitry 643 may be coupled to an antenna 640.

The processing unit 646 controls operation of the wireless device 600. The processing unit 646 may also be referred to as a central processing unit (CPU). Memory 647, which may include both read-only memory (ROM) and random access memory (RAM), provides instructions and data to the processing unit 646. A portion of the memory 647 may also include non-volatile random access memory (NVRAM).

The various components of the wireless device 600 are coupled together by a bus system 649 which may include a power bus, a control signal bus, and a status signal bus in addition to a data bus. For the sake of clarity, the various busses are illustrated in FIG. 6 as the bus system 649.

The steps of the methods discussed may also be stored as instructions in the form of software or firmware located in memory 647 in a wireless device 600. These instructions may be executed by the controller/processor(s) 110 of the wireless device 600. Alternatively, or in conjunction, the steps of the methods discussed may be stored as instructions in the form of software or firmware 648 located in memory 647 in the wireless device 600. These instructions may be executed by the processing unit 646 of the wireless device 600 in FIG. 6.

Figure 7:
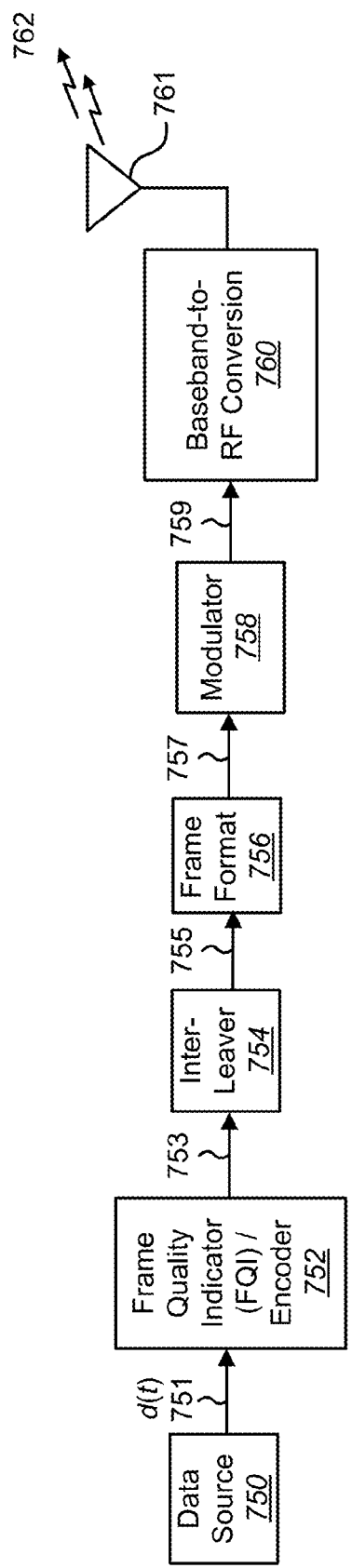
FIG. 7 illustrates an example of a transmitter structure and/or process according to some embodiments of the present invention.

FIG. 7 illustrates an example of a transmitter structure and/or process. The transmitter structure and/or process of FIG. 7 may be implemented in a wireless device such as a wireless communication device 104 or a base station 102. The functions and components shown in FIG. 7 may be implemented by software, hardware, or a combination of software and hardware. Other functions may be added to FIG. 7 in addition to or instead of the functions shown.

In FIG. 7, a data source 750 provides data d(t) 751 to a frame quality indicator (FQI)/encoder 752. The frame quality indicator (FQI)/encoder 752 may append a frame quality indicator (FQI) such as a cyclic redundancy check (CRC) to the data d(t). The frame quality indicator (FQI)/encoder 752 may further encode the data and frame quality indicator (FQI) using one or more coding schemes to provide encoded symbols 753. Each coding scheme may include one or more types of coding, e.g., convolutional coding, Turbo coding, block coding, repetition coding, other types of coding or no coding at all. Other coding schemes may include automatic repeat request (ARQ), hybrid ARQ (H-ARQ) and incremental redundancy repeat techniques. Different types of data may be encoded with different coding schemes.

An interleaver 754 interleaves the encoded data symbols 753 in time to combat fading and generates symbols 755. The interleaved symbols 755 may be mapped by a frame format block 756 to a pre-defined frame format to produce a frame 757. In an example, a frame format block 756 may specify the frame 757 as being composed of a plurality of sub-segments. Sub-segments may be any successive portions of a frame 757 along a given dimension, e.g., time, frequency, code or any other dimension. A frame 757 may be composed of a fixed plurality of such sub-segments, each sub-segment containing a portion of the total number of symbols allocated to the frame. In one example, the interleaved symbols 755 are segmented into a plurality S of sub-segments making up a frame 757.

A frame format block 756 may further specify the inclusion of, e.g., control symbols (not shown) along with the interleaved symbols 755. Such control symbols may include, e.g., power control symbols, frame format information symbols, etc.

A modulator 758 modulates the frame 757 to generate modulated data 759. Examples of modulation techniques include binary phase shift keying (BPSK) and quadrature phase shift keying (QPSK). The modulator 758 may also repeat a sequence of modulated data.

A baseband-to-radio-frequency (RF) conversion block 760 may convert the modulated data 759 to RF signals for transmission via an antenna 761 as signal 762 over a wireless communication link to one or more wireless device receivers.

Figure 8:
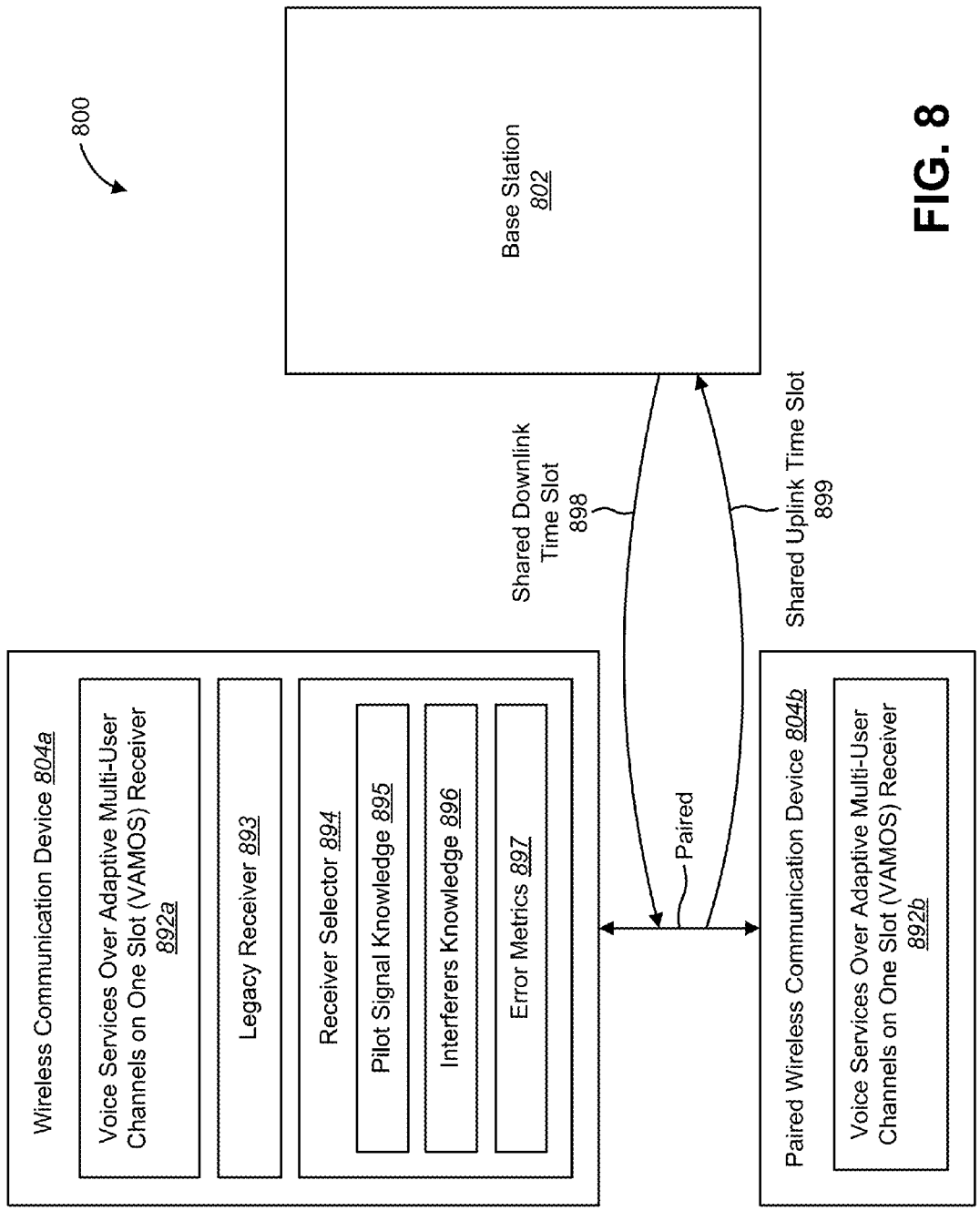
FIG. 8 shows a wireless communication system with multiple wireless devices according to embodiments of the present invention.

FIG. 8 shows a wireless communication system 800 with multiple wireless devices according to embodiments of the present invention. Wireless communication systems 800 are widely deployed to provide various types of communication content such as voice, data, and so on. In embodiments of the present invention, a wireless device may be a base station 802 or a wireless communication device 804a-b.

A base station 802 is a station that communicates with one or more wireless communication devices 804. A base station 802 may also be referred to as, and may include some or all of the functionality of, an access point, a broadcast transmitter, a NodeB, an evolved NodeB, etc. The term "base station" will be used herein. Each base station 802 provides communication coverage for a particular geographic area. A base station 802 may provide communication coverage for one or more wireless communication devices 804. The term "cell" can refer to a base station 802 and/or its coverage area depending on the context in which the term is used.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

A wireless communication device 804 may be referred to as, and may include some or all of the functionality of, a terminal, an access terminal, a subscriber unit, a user equipment (UE), a station, etc. A wireless communication device 804 may be a cellular phone, a personal digital assistant (PDA), a wireless device, a wireless modem, a handheld device, a laptop computer, a Session Initiation Protocol (SIP) phone, a wireless local loop (WLL) station, etc.

A wireless communication device 804 may communicate with zero, one or multiple base stations 802 on the downlink and/or uplink at any given moment. The downlink (or forward link) refers to the communication link from a base station 802 to a wireless communication device 804, and the uplink (or reverse link) refers to the communication link from a wireless communication device 804 to a base station 802.

The wireless communication device 804 may include a voice services over adaptive multi-user channels on one slot (VAMOS) receiver 892a and a legacy receiver 893. Voice services over adaptive multi-user channels on one slot (VAMOS) is a new feature that has been introduced in GSM specifications where a pair of users (e.g., the wireless communication device 804a and a paired wireless communication device 804b) are meant to share a timeslot (i.e., a shared downlink timeslot 898 or a shared uplink timeslot 899). The use of voice services over adaptive multi-user channels on one slot (VAMOS) is contrary to legacy GSM design. Wireless communication devices 804 that include a voice services over adaptive multi-user channels on one slot (VAMOS) receiver 892a-b may still include a legacy receiver 893 to allow for legacy communications.

The motivation for using voice services over adaptive multi-user channels on one slot (VAMOS) is that over time, wireless communication devices 804 have developed receivers that are capable of handling high levels of interference and would therefore be able to handle the shared timeslot configuration, allowing for increased transceiver peak capacity. However, the conditions that warrant the use of voice services over adaptive multi-user channels on one slot (VAMOS)

receivers 892 are not always constant. As wireless channel conditions change, it may sometimes be beneficial for a wireless communication device 804 that is equipped with a voice services over adaptive multi-user channels on one slot (VAMOS) receiver 892 to instead use the legacy receiver 893. For example, this may be the case when the wireless channel conditions are noise limited instead of interference limited (i.e., when noise is the limiting factor instead of interference).

Ideally, the wireless communication device 804a may always use the voice services over adaptive multi-user channels on one slot (VAMOS) receiver 892 when the wireless communication device 804a is paired with a paired wireless communication device 804b. However, the wireless communication device 804a is not always aware of a voice services over adaptive multi-user channels on one slot (VAMOS) pairing with a paired wireless communication device 804b, as this information is not broadcast by the network. Thus, the wireless communication device 804a may potentially switch to using a legacy receiver 893 while the wireless communication device 804a is paired with a paired wireless communication device 804b in a voice services over adaptive multi-user channels on one slot (VAMOS) call. In such a scenario, the switching to the legacy receiver 893 may result in high interference and thus poor performance for the voice services over adaptive multi-user channels on one slot (VAMOS) call.

To prevent such high interference scenarios, the wireless communication device 804a may include a receiver selector 894. The receiver selector 894 may allow the wireless communication device 804 to select a receiver based on perceived wireless channel conditions. The receiver selector 894 may check for and quantify the presence of interference on a GSM timeslot. The receiver selector 894 may include pilot signal knowledge 895 and interferers knowledge 896. The receiver selector 894 may use the pilot signal knowledge 895 and the interferers knowledge 896 to compute error metrics 897. The inverse of the error metrics 897 is a representation of the channel quality for all paired wireless communication devices 804 that are sharing the shared timeslot.

The knowledge of the strength of paired wireless communication devices 804b in a voice services over adaptive multi-user channels on one slot (VAMOS) call may be useful, especially when selecting the right receiver in high interference scenarios. Furthermore, the knowledge of the strength of paired wireless communication devices 804b can help save microprocessor without interlocked pipeline stages (MIPS) and current under low interference scenarios when the wireless communication device 804a can suffice using the legacy receiver 893.

The relative strength of the error metrics 897 may thus quantitatively describe the power imbalance between the wireless communication device 804a and any paired wireless communication device 804b. The receiver selector 894 can use the error metrics 897 to determine whether the wireless communication device 804a should use a voice services over adaptive multi-user channels on one slot (VAMOS) receiver 892a or a legacy receiver 893. Thus, poor voice performance by the wireless communication device 804a may be reduced by allowing the receiver selector 894 to select which receiver is used based on the presence and strength of interferers.

Figure 9:
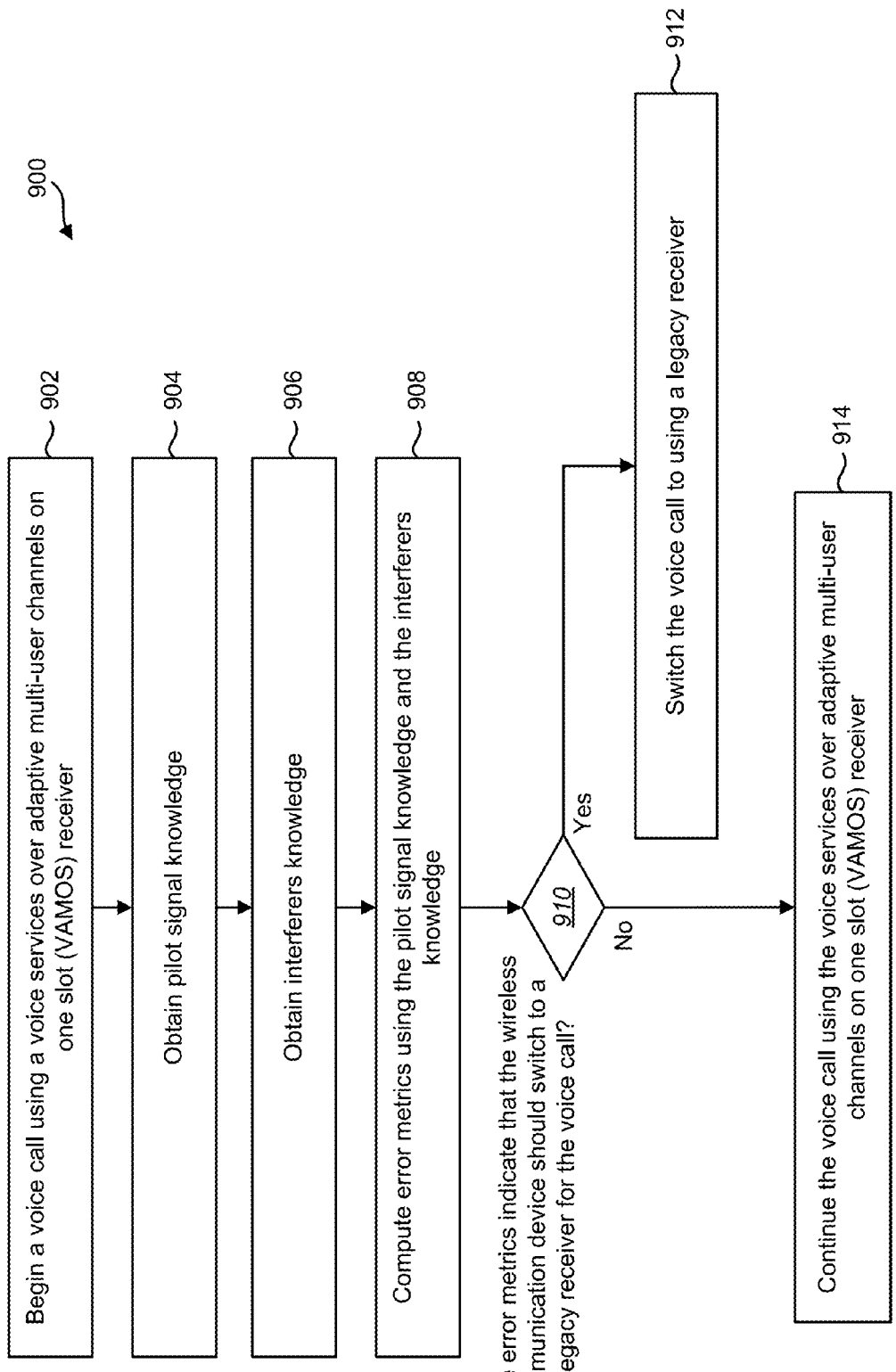
FIG. 9 is a flow diagram of a method for using error metrics to determine whether a wireless communication device should use a voice services over adaptive multi-user channels on one slot (VAMOS) receiver or a legacy receiver according to some embodiments of the present invention.

FIG. 9 is a flow diagram of a method 900 for using error metrics 897 to determine whether a wireless communication device 804a should use a voice services over adaptive multi-user channels on one slot (VAMOS) receiver 892a or a legacy receiver 893. The method 900 may be performed by a wireless communication device 804a. In one configuration, the wireless communication device 804a may include a receiver selector 894. The wireless communication device 804a may begin 902 a voice call using a voice services over adaptive multi-user channels on one slot (VAMOS) receiver 892a. The voice call using the voice services over adaptive multi-user channels on one slot (VAMOS) receiver 892a may or may not share a timeslot with a paired wireless communication device 804b.

The wireless communication device 804a may obtain 904 pilot signal knowledge 895. The pilot signal knowledge 895 may be obtained from pilot signals received from a base station 802. In one configuration, the pilot signal knowledge 895 may be obtained prior to beginning the voice call using the voice services over adaptive multi-user channels on one slot (VAMOS) receiver 892a.

The wireless communication device 804a may also obtain 906 interferers knowledge 896. The interferers knowledge 896 may be provided by the network to the wireless communication device 804a or may be measured by the wireless communication device 804a. For example, the wireless communication device 804a may be measured by the wireless communication device 804a using the pilot signals.

The wireless communication device 804a may compute 908 error metrics. Error metrics may be computed 897 using the pilot signal knowledge 895 and the interferers knowledge 896 in some embodiments. The error metrics 897 may be the square of the absolute error between the pilot signal and the received signal. In addition, the error metrics may be the square of the absolute error between the pilot signal and the estimated pilot signal. Error metrics may be a threshold (static or dynamic) in some embodiments and in others, the error metrics may represent a range of values such that error metrics are relatively good in the range and relatively poor outside of the range. In some embodiments, error metrics can be used to characterize varying power levels such that the relative value (weakness or strength) can then quantitatively describe power imbalance between multiple users.

The wireless communication device 804a may determine 910 whether the error metrics 897 indicate that the wireless communication device 804a should switch to a legacy receiver 893 for the voice call. For example, the wireless communication device 804a may determine whether the error metrics 897 indicate that the wireless communication device 804a is sharing a timeslot with a paired wireless communication device 804b or not. In other words, the wireless communication device 804a may select a receiver for the voice call based on the error metrics 897. If it is determined that the error metrics 897 indicate that the wireless communication device 804a should switch to a legacy receiver 893 for the voice call, the wireless communication device 804a may switch 912 the voice call to using a legacy receiver 893. If it is determined that the error metrics 897 indicate that the wireless communication device 804a should continue using the voice services over adaptive multi-user channels on one slot (VAMOS) receiver 892a for the voice call, the wireless communication device 804a may continue 914 the voice call using the voice services over adaptive multi-user channels on one slot (VAMOS) receiver 892a.

Figure 10:
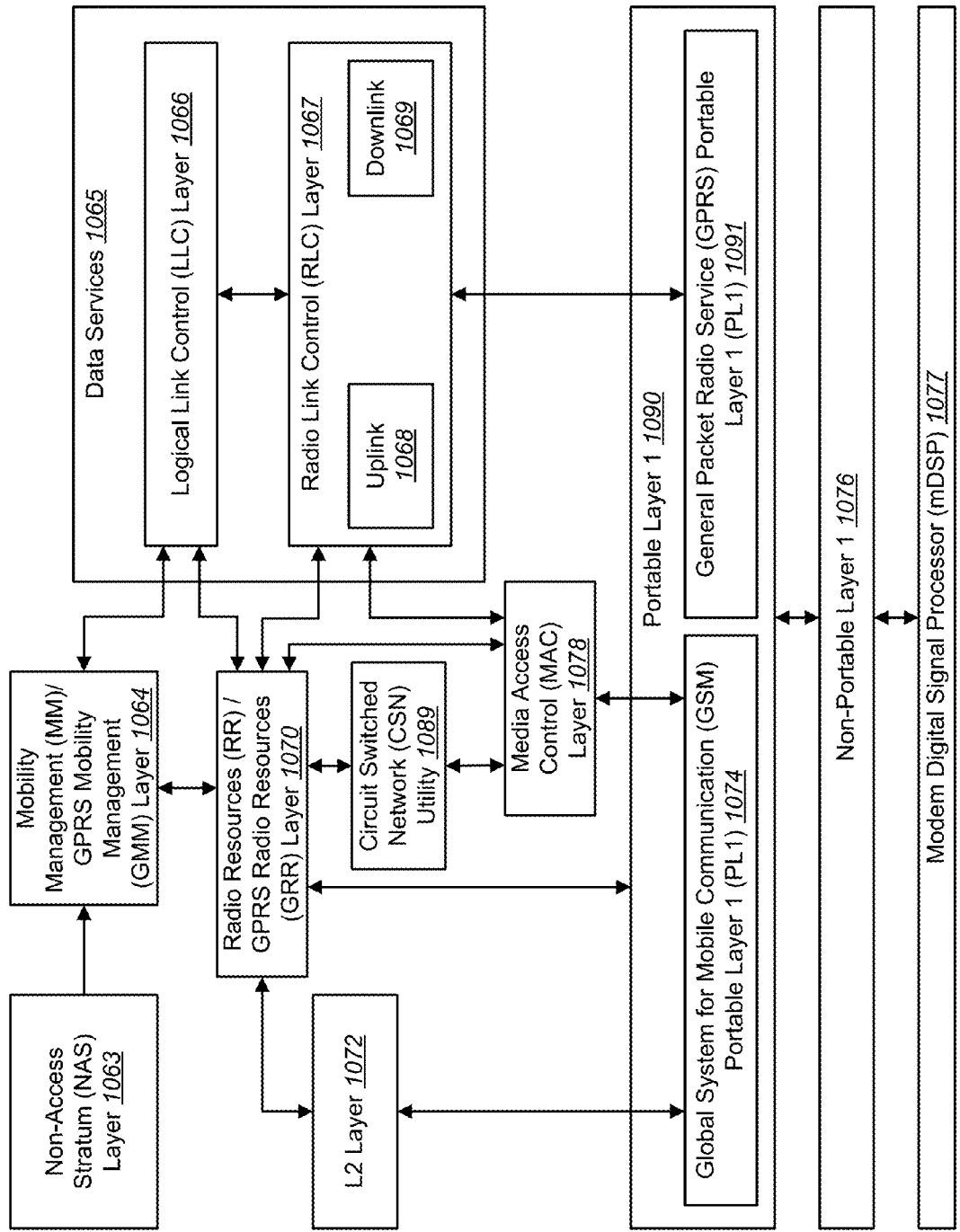
FIG. 10 is a block diagram illustrating some of the elements of the GERAN stack that are used to support voice services over adaptive multi-user channels on one slot (VAMOS) in some embodiments of the present invention.

FIG. 10 is a block diagram illustrating some of the elements of the GERAN stack that are used to support voice services over adaptive multi-user channels on one slot (VAMOS) in some embodiments of the present invention. The non-access stratum (NAS) layer 1063 may include the voice services over adaptive multi-user channels on one slot (VAMOS) radio capability classmark. The non-access stratum (NAS) layer 1063 may send information to the mobility management (MM)/GPRS mobility management (GMM) layer 1064. The mobility management (MM)/GPRS mobility management (GMM) layer 1064 may communicate with a logical link control (LLC) layer 1066 in data services 1065. The mobility management (MM)/GPRS mobility management (GMM) layer 1064 may also communicate with a radio resources (RR)/GPRS radio resources (GRR) layer 1070.

The data services 1065 may also include a radio link control (RLC) layer 1067 for uplink 1068 and downlink 1069 communications. The radio link control (RLC) layer 1067 may communicate with the logical link control (LLC) layer 1066 and the radio resources (RR)/GPRS radio resources (GRR) layer 1070. The logical link control (LLC) layer 1066 may also communicate with the radio resources (RR)/GPRS radio resources (GRR) layer 1070. The radio link control (RLC) layer 1067 may also communicate with a General Packet Radio Service (GPRS) Portable Layer 1 (PL1) 1091 of the portable layer 1 1090. The portable layer 1 1090 may include the General Packet Radio Service (GPRS) Portable Layer 1 (PL1) 1091 and the Global Systems for Mobile Communication (GSM) Portable Layer 1 (PL1) 1074. The radio resources (RR)/GPRS radio resources (GRR) layer 1070 may communicate directly with the portable layer 1 1090.

The radio resources (RR)/GPRS radio resources (GRR) layer 1070 may also communicate with the Global Systems for Mobile Communication (GSM) Portable Layer 1 (PL1) 1074 via an L2 layer 1072. The radio resources (RR)/GPRS radio resources (GRR) layer 1070 may communicate with a media access control (MAC) layer 1078 via a Circuit Switched Network (CSN) Utility 1089. The radio resources (RR)/GPRS radio resources (GRR) layer 1070 may also communicate directly with the media access control (MAC) layer 1078. The media access control (MAC) layer 1078 may communicate with both the radio link control (RLC) layer 1067 and the General Packet Radio Service (GPRS) Portable Layer 1 (PL1) 1091. The portable layer 1 1090 may communicate with a non-portable layer 1 1076. The non-portable layer 1 1076 may then communicate with a modem digital signal processor (mDSP) 1077.

Figure 11:
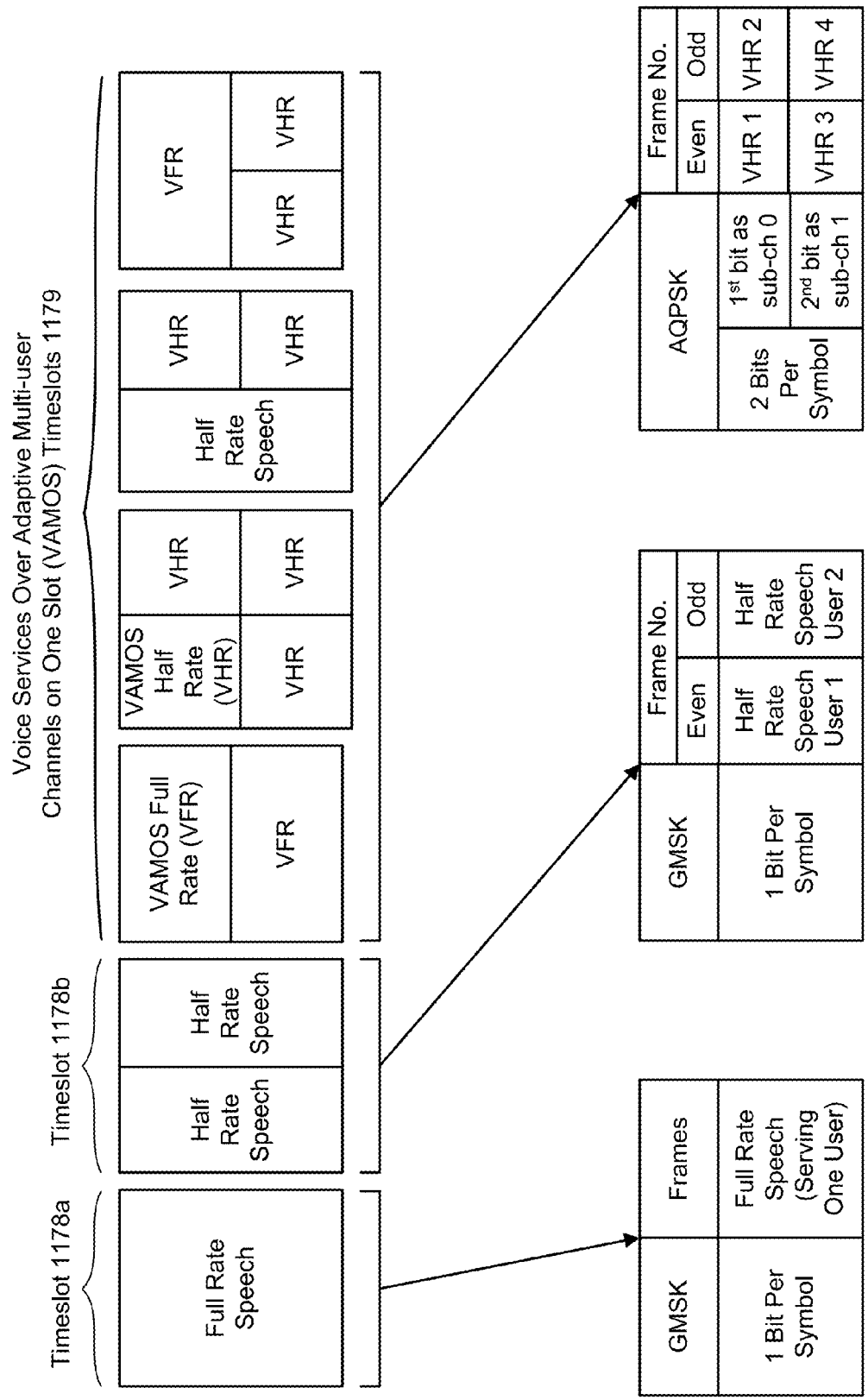
FIG. 11 is a block diagram illustrating how, in some embodiments, different numbers of users may be served in a timeslot using voice services over adaptive multi-user channels on one slot (VAMOS)

FIG. 11 is a block diagram illustrating how, in some embodiments, different numbers of users may be served in timeslots 1179 using voice services over adaptive multi-user channels on one slot (VAMOS). In a non-VAMOS slot 1178a, one full rate speech (FR) wireless communication device 104 may be served using Gaussian minimum shift keying (GMSK). Or, in a non-VAMOS slot 1178b, two half rate speech (HR) wireless communication devices 104 may be served using Gaussian minimum shift keying (GMSK). In voice services over adaptive multi-user channels on one slot (VAMOS), two wireless communication devices 104 may be paired using adaptive quadrature phase shift keying (AQPSK) on the downlink 1069 while using Gaussian minimum shift keying (GMSK) unchanged on the uplink 1068. Thus, two full rate speech (FR) and four half rate speech (HR) wireless communication devices 104 can be served on one timeslot 1179. Voice services over adaptive multi-user channels on one slot (VAMOS) are compatible with legacy wireless communication devices 104 and can make use of well the established downlink advanced receiver performance (DARP) feature. As used herein, legacy wireless communication devices 104 refers to downlink advanced receiver performance (DARP) phones and pre-DARP phones. In some cases, using voice services over adaptive multi-user channels on one slot (VAMOS) may double the capacity or achieve the same capacity using half the spectrum when compared to the standard Global Systems for Mobile Communication (GSM) framework.

The voice services over adaptive multi-user channels on one slot (VAMOS) feature was introduced in 3GPP GERAN Release 9 standards in order to improve the spectrum efficiency for Circuit Switched (CS) connections. Voice services over adaptive multi-user channels on one slot (VAMOS) may only be applicable to the Circuit Switched (CS) voice service and not the Packet Switched (PS) data service.

Voice services over adaptive multi-user channels on one slot (VAMOS) may serve two wireless communication devices 104 simultaneously on the same physical resources (i.e., on the same timeslot and the same absolute radio-frequency channel number (ARFCN)) in the circuit switched mode both in the downlink 1069 and in the uplink 1068 in one embodiment. Hence, a basic physical channel capable of voice services over adaptive multi-user channels on one slot (VAMOS) may support up to four transmit channel (TCH)/half rate (HR) channels along with their associated control channels (i.e., the fast associated control channel (FACCH) and the slow associated control channel (SACCH/T) (half rate)). Voice services over adaptive multi-user channels on one slot (VAMOS) may be used for voice service configurations for one timeslot 1179 by network control for three, four or five wireless communication devices 104 without telling each wireless communication device 104 involved.

The symbols shown are a simplified version of the resource usage. A legacy full rate speech (FR) may use the entire symbol, which only has 1 bit, and all of the frame number (FN). Hence, one unit of resource (i.e., one timeslot 1179) may serve one wireless communication device 104 at any time. However, using the existing half rate speech (HR) service, based on Gaussian minimum shift keying (GMSK) modulation, the unit of resource may be divided on the frame number (FN) dimension. Thus, two wireless communication devices 104 may be served from one transmit channel (TCH) resource (classified by an even frame number (FN) and an odd frame number (FN)). When the radio frequency (RF) conditions are good enough to support half rate speech (HR), capacity gain may be achieved. In the voice services over adaptive multi-user channels on one slot (VAMOS) mode, which is based on adaptive quadrature phase shift keying (AQPSK) modulation, two bits/symbol may provide another dimension (i.e., the number of bits per symbol on top of the previous half rate speech (HR) scheme). Thus, a base station 102 using voice services over adaptive multi-user channels on one slot (VAMOS) may support up to four half rate speech (HR) voice services over adaptive multi-user channels on one slot (VAMOS) calls in one transmit channel (TCH) resource (i.e., voice services over adaptive multi-user channels on one slot (VAMOS) timeslots 1179) when the radio frequency (RF) conditions are good enough to support adaptive quadrature phase shift keying (AQPSK) with half rate speech (HR) codecs, including Adaptive Multi-Rate (AMR) half rate speech (HR).

The variety of Circuit Switched (CS) services for a legacy system is shown by the first two blocks (timeslots 1178a-b), which can support up to two wireless communication devices 104. By using voice services over adaptive multi-user channels on one slot (VAMOS), additional wireless communication devices 104 per timeslot 1179 may be used (e.g., up to four total). The channel organization for the transmit channel (TCH), the fast associated control channel (FACCH) and the slow associated control channel (SACCH/T) (half rate) in voice services over adaptive multi-user channels on one slot (VAMOS) mode may be compatible with the legacy mode. A voice services over adaptive multi-user channels on one slot (VAMOS) level 1 wireless communication device 104 does not have any differences as far as channel organization is concerned. Voice services over adaptive multi-user channels on one slot (VAMOS) level 1 is a downlink advanced receiver performance (DARP) based solution. Voice services over adaptive multi-user channels on one slot (VAMOS) level 2 can enable further performance improvement with the knowledge of both training sequence codes (TSCs) in the pair and further slow associated control channel (SACCH) channel shift to maximize performance.

Figure 12:
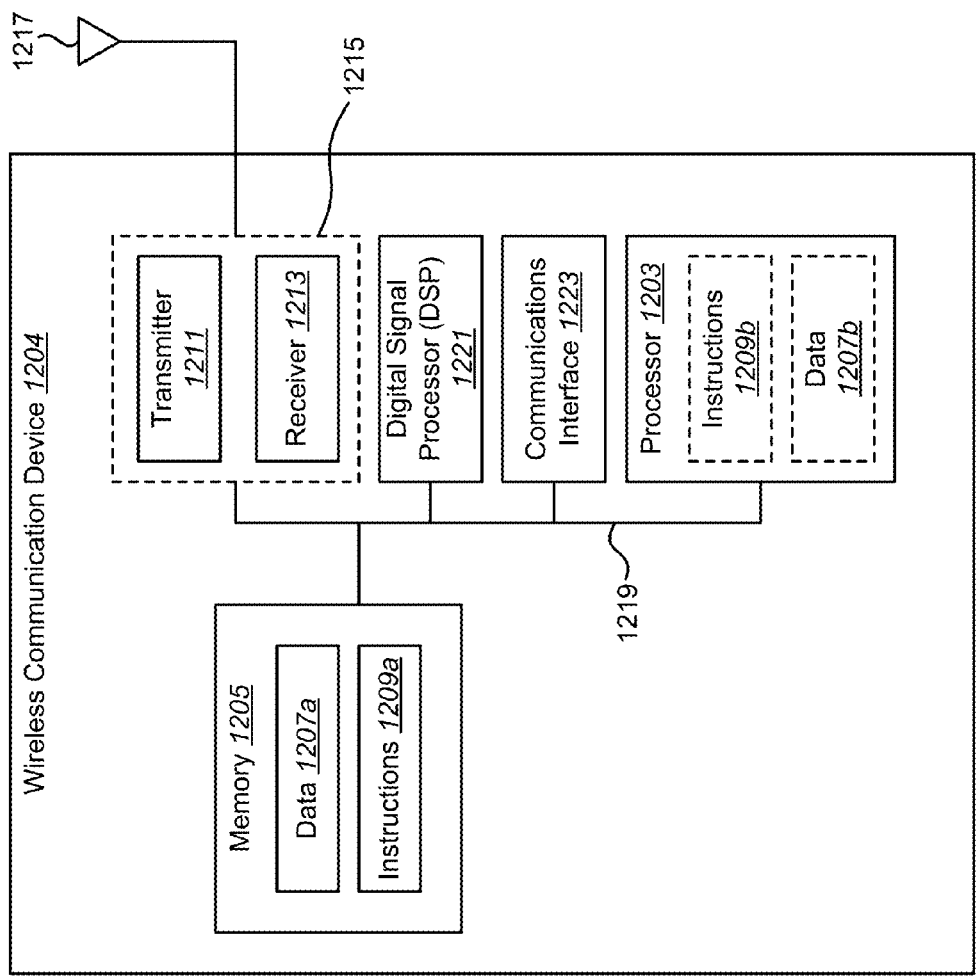
FIG. 12 illustrates certain components that may be included within a wireless communication device according to some embodiments of the present invention.

FIG. 12 illustrates certain components that may be included within a wireless communication device 1204. The wireless communication device 1204 may be an access terminal, a mobile station, a user equipment (UE), etc. The wireless communication device 1204 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless communication device 1204 of FIG. 12, in an alternative configuration, a combination of processors (e.g., an ARM and DSP) could be used.

The wireless communication device 1204 also includes memory 1205. The memory 1205 may be any electronic component capable of storing electronic information. The memory 1205 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1207a and instructions 1209a may be stored in the memory 1205. The instructions 1209a may be executable by the processor 1203 to implement the methods disclosed herein. Executing the instructions 1209a may involve the use of the data 1207a that is stored in the memory 1205. When the processor 1203 executes the instructions 1209, various portions of the instructions 1209b may be loaded onto the processor 1203, and various pieces of data 1207b may be loaded onto the processor 1203.

The wireless communication device 1204 may also include a transmitter 1211 and a receiver 1213 to allow transmission and reception of signals to and from the wireless communication device 1204 via an antenna 1217. The transmitter 1211 and receiver 1213 may be collectively referred to as a transceiver 1215. The wireless communication device 1204 may also include (not shown) multiple transmitters, multiple antennas, multiple receivers and/or multiple transceivers.

The wireless communication device 1204 may include a digital signal processor (DSP) 1221. The wireless communication device 1204 may also include a communications interface 1223. The communications interface 1223 may allow a user to interact with the wireless communication device 1204.

The various components of the wireless communication device 1204 may be coupled together by one or more buses, which may include a power bus, a control signal bus, a status signal bus, a data bus, etc. For the sake of clarity, the various buses are illustrated in FIG. 12 as a bus system 1219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communications, the method being implemented by a wireless communication device, the method comprising:
    beginning a voice call using a voice services over adaptive multi-user channels on one slot receiver;
    obtaining pilot signal knowledge;
    obtaining interferers knowledge;
    computing error metrics using the pilot signal knowledge and the interferers knowledge, wherein computing the error metrics comprises computing a square of an absolute error between (i) a pilot signal, and (ii) at least one of a received signal and an estimated pilot signal;
    determining, based on the error metrics, that the wireless communication device is not sharing a timeslot with a paired wireless communication device; and
    switching to a legacy receiver for the voice call.

2. The method of claim 1, wherein the error metrics indicate a wireless communications channel that is interference limited.

3. The method of claim 1, wherein the error metrics indicate that the legacy receiver should be used for the voice call.

4. The method of claim 3, wherein the error metrics indicate a wireless communications channel that is noise limited.

5. The method of claim 1, wherein an inverse of the error metrics is a representation of a channel quality for all paired wireless communication devices that are sharing a timeslot.

6. The method of claim 1, wherein a relative strength of the error metrics quantitatively describes a power imbalance between paired wireless communication devices.

7. An apparatus for wireless communications, comprising:
    a processor;
    memory in electronic communication with the processor; and
    instructions stored in the memory, the instructions being executable by the processor to:
        begin a voice call using a voice services over adaptive multi-user channels on one slot receiver;
        obtain pilot signal knowledge;
        obtain interferers knowledge;
        compute error metrics using the pilot signal knowledge and the interferers knowledge, wherein computing the error metrics comprises computing a square of an absolute error between (i) a pilot signal, and (ii) at least one of a received signal and an estimated pilot signal;
        determine, based on the error metrics, that the apparatus is not sharing a timeslot with a paired wireless communication device; and
        switch to a legacy receiver for the voice call.

8. The apparatus of claim 7, wherein the apparatus is a wireless communication device.

9. The apparatus of claim 7, wherein the error metrics indicate a wireless communications channel that is interference limited.

10. The apparatus of claim 7, wherein the error metrics indicate that the legacy receiver should be used for the voice call.

11. The apparatus of claim 10, wherein the error metrics indicate a wireless communications channel that is noise limited.

12. The apparatus of claim 7, wherein an inverse of the error metrics is a representation of a channel quality for all paired wireless communication devices that are sharing a timeslot.

13. The apparatus of claim 7, wherein a relative strength of the error metrics quantitatively describes a power imbalance between paired wireless communication devices.

14. A wireless device comprising:
    means for beginning a voice call using a voice services over adaptive multi-user channels on one slot receiver;
    means for obtaining pilot signal knowledge;
    means for obtaining interferers knowledge;
    means for computing error metrics using the pilot signal knowledge and the interferers knowledge, wherein the means for computing the error metrics comprise means for computing a square of an absolute error between (i) a pilot signal, and (ii) at least one of a received signal and an estimated pilot signal;

means for determining, based on the error metrics, that the wireless device is not sharing a timeslot with a paired wireless communication device; and means for switching to a legacy receiver for the voice call.

15. The wireless device of claim 14, wherein the error metrics indicate a wireless communications channel that is interference limited.

16. The wireless device of claim 14, wherein the error metrics indicate that the legacy receiver should be used for the voice call.

17. The wireless device of claim 16, wherein the error metrics indicate a wireless communications channel that is noise limited.

18. A computer-program product for wireless communications, the computer-program product comprising a non-transitory computer-readable medium having instructions thereon, the instructions comprising:

code for causing a wireless communication device to begin a voice call using a voice services over adaptive multi-user channels on one slot receiver;

code for causing the wireless communication device to obtain pilot signal knowledge;

code for causing the wireless communication device to obtain interferers knowledge;

code for causing the wireless communication device to compute error metrics using the pilot signal knowledge and the interferers knowledge, wherein the code for computing the error metrics comprises code for computing a square of an absolute error between (i) a pilot signal, and (ii) at least one of a received signal and an estimated pilot signal;

code for determining, based on the error metrics, that the wireless communication device is not sharing a timeslot with a paired wireless communication device; and code for switching to a legacy receiver for the voice call.

19. The computer-program product of claim 18, wherein the error metrics indicate a wireless communications channel that is interference limited.

20. The computer-program product of claim 18, wherein the error metrics indicate that the legacy receiver should be used for the voice call.

21. The computer-program product of claim 20, wherein the error metrics indicate a wireless communications channel that is noise limited.

22. A wireless communication device, comprising:

a communications interface for transmitting and receiving wireless signals; and a processor operatively coupled to the communications interface, the processor being configured to:

begin a voice call using a voice services over adaptive multi-user channels on one slot receiver;

obtain pilot signal knowledge;

obtain interferers knowledge;

compute error metrics using the pilot signal knowledge and the interferers knowledge, wherein computing the error metrics comprises computing a square of an absolute error between (i) a pilot signal, and (ii) at least one of a received signal and an estimated pilot signal;

determine, based on the error metrics, that the wireless communication device is not sharing a timeslot with a paired wireless communication device; and switch to a legacy receiver for the voice call.

23. The wireless communication device of claim 22, wherein the error metric value characterizes a power imbalance ratio.

24. The wireless communication device of claim 22, wherein the error metric value indicate whether a wireless channel is interference limited or noise limited.

* * * * *